(12) United States Patent
Yamada

(10) Patent No.: US 10,515,200 B2
(45) Date of Patent: Dec. 24, 2019

(54) EVALUATION DEVICE, EVALUATION METHOD, AND COMPUTER-READABLE NON-TRANSITORY MEDIUM

(71) Applicant: FUJITSU LIMITED, Kawasaki-shi, Kanagawa (JP)

(72) Inventor: Shigefumi Yamada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 228 days.

(21) Appl. No.: 15/664,609

(22) Filed: Jul. 31, 2017

(65) Prior Publication Data
US 2018/0052984 A1 Feb. 22, 2018

(30) Foreign Application Priority Data
Aug. 18, 2016 (JP) .................................. 2016-160597

(51) Int. Cl.
*G06F 21/32* (2013.01)
*G06K 9/00* (2006.01)
*G06F 17/18* (2006.01)

(52) U.S. Cl.
CPC .............. *G06F 21/32* (2013.01); *G06F 17/18* (2013.01); *G06K 9/00926* (2013.01)

(58) Field of Classification Search
CPC ..... G06F 21/32; G06F 17/18; G06K 9/00926; G06K 9/00885; G06K 9/6262; H04L 63/0861
See application file for complete search history.

(56) References Cited

U.S. PATENT DOCUMENTS

| | | | | |
|---|---|---|---|---|
| 2003/0031348 A1* | 2/2003 | Kuepper | ............... | G06K 9/6293 382/116 |
| 2007/0036400 A1* | 2/2007 | Watanabe | ............... | G06K 9/001 382/124 |

(Continued)

FOREIGN PATENT DOCUMENTS

| | | |
|---|---|---|
| JP | 11-306352 | 11/1999 |
| WO | 2010/047685 A1 | 4/2010 |

OTHER PUBLICATIONS

EESR—The Extended European Search Report dated Sep. 29, 2017 for European Patent Application No. 71840176. ** Non-Patent Literature by Dass et al. cited in the EESR was previously submitted in the IDS filed on Jul. 31, 2017.

(Continued)

*Primary Examiner* — Bobbak Safaipour
(74) *Attorney, Agent, or Firm* — Fujitsu Patent Center

(57) ABSTRACT

An evaluation device includes: a memory; and a processor coupled to the memory and the processor configured to execute a process, the process comprising: generating a plurality of sets from a first population of biometric data collected from a plurality of users, a number of biometric data of the plurality of sets being smaller than that of the first population, at least a part of the plurality of sets being different from each other; estimating a probability density distribution of similarity degrees of different people's pairs of each of the plurality of sets; calculating a false acceptance rate with respect to each similarity degree threshold on a basis of the probability density distribution, with respect to each of the plurality of sets; and estimating a combined false acceptance rate from a statistic amount of false acceptance rates of the plurality of sets calculated by the calculating.

15 Claims, 11 Drawing Sheets

(56) References Cited

U.S. PATENT DOCUMENTS

| | | | | |
|---|---|---|---|---|
| 2008/0317294 | A1* | 12/2008 | Hashimoto | G07C 9/00158 382/115 |
| 2009/0171623 | A1* | 7/2009 | Kiefer | G06N 20/00 702/181 |
| 2010/0077278 | A1* | 3/2010 | Wang | G06K 9/00885 714/752 |
| 2017/0116401 | A1* | 4/2017 | Kim | G06F 21/32 |

OTHER PUBLICATIONS

Bolle R. M. et al., "Error analysis of pattern recognition systems—the subsets bootstrap", Computer Vision and Image Understanding, Academic Press, USA, vol. 93, No. 1, pp. 1-33, Jan. 1, 2004.
Herve Jarosz et al., "Large-Scale Identification System Design", Chapter 9, pp. 263-287, Biometric Systems, Springer, 2004 (25 pages).
Sarat Dass et al., "Validating a Biometric Authentication System: Sample Size Requirements", IEEE Trans. on PAMI, Issue No. 12, Dec. 2006 (19 pages).
EPOA—Communication pursuant to Article 94(3) EPC of European Patent Application No. 17184017.6 dated Jan. 22, 2019. ** All references cited in the EPOA were previously submitted in the IDS filed on Jul. 31 and Oct. 13, 2017.
EPOA—The Communication pursuant to Article 94(3) EPC dated June 12, 2019 in a counterpart European Patent Application No. 171840176. ** Non-Patent Literature cited in the EPOA was previously submitted in the IDS filed on Jul. 31, 2017.

* cited by examiner

FIG. 6

| ID | BIOMETRIC DATA |
|---|---|
| 000001 | |
| 000002 | |
| 000003 | |
| ... | |

EVALUATION DEVICE, EVALUATION METHOD, AND COMPUTER-READABLE NON-TRANSITORY MEDIUM

CROSS-REFERENCE TO RELATED APPLICATION

This application is based upon and claims the benefit of priority of the prior Japanese Patent Application No. 2016-160597, filed on Aug. 18, 2016, the entire contents of which are incorporated herein by reference.

FIELD

A certain aspect of embodiments described herein relates to an evaluation device, an evaluation method and a computer-readable non-transitory medium.

BACKGROUND

There are a false acceptance rate and a false rejection rate as evaluation indices of a biometric authentication algorism. In order to measure these evaluation indices, an authentication simulation using a biometric data set collected from a plurality of users is performed. It is necessary to evaluate authentication accuracy when a sensor is newly developed. Therefore, biometric data are collected with use of a new sensor.

SUMMARY

In order to satisfy a false acceptance rate (for example, 0.0001% level) needed for produced authentication technology, it is necessary to collect a few thousands or more biometric data (the number of fingers in a case of fingerprint authentication or the number of hands in case of palm authentication). Therefore, a cost increases. In terms of the cost, it is preferable that the number of biometric data to be collected is smaller.

According to an aspect of the present invention, there is provided an evaluation device including: a memory; and a processor coupled to the memory and the processor configured to execute a process, the process including: generating a plurality of sets from a first population of biometric data collected from a plurality of users, a number of biometric data of the plurality of sets being smaller than that of the first population, at least a part of the plurality of sets being different from each other; estimating a probability density distribution of similarity degrees of different people's pairs of each of the plurality of sets; calculating a false acceptance rate with respect to each similarity degree threshold on a basis of the probability density distribution, with respect to each of the plurality of sets; and estimating a combined false acceptance rate from a statistic amount of false acceptance rates of the plurality of sets calculated by the calculating.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 illustrates biometric data included in a biometric data set;

DESCRIPTION OF EMBODIMENTS

Figure 1:
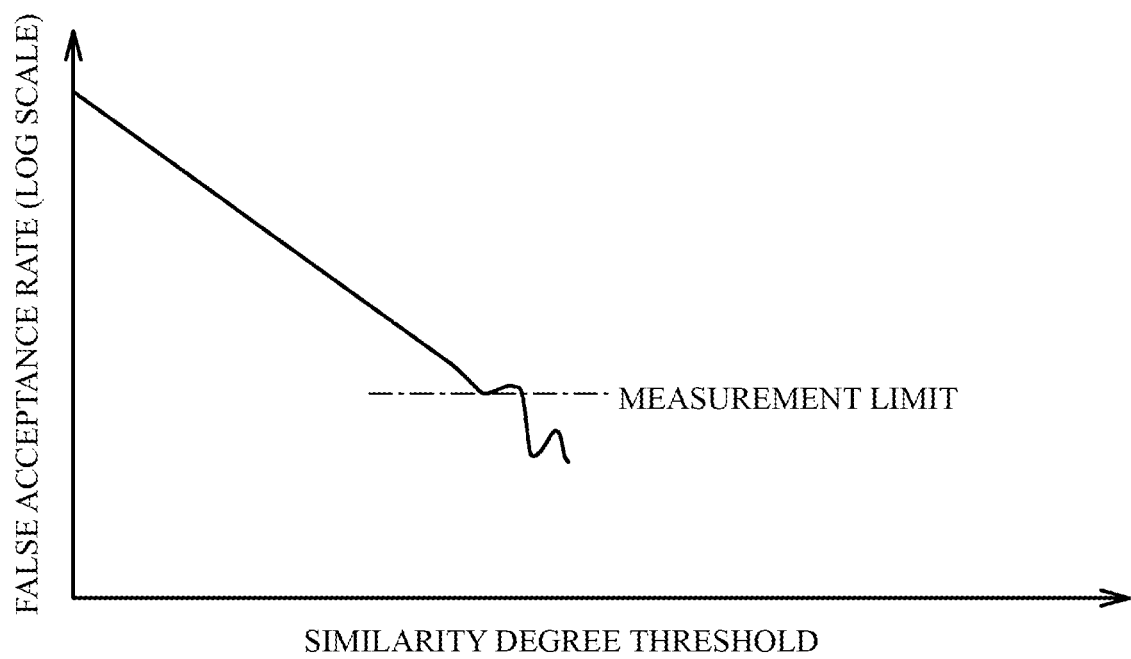
FIG. 1 illustrates estimation results of similarity degree distribution.

Before describing embodiments, a description will be given of an evaluation index of a biometric authentication algorism. There are FAR (False Acceptance Rate) and FRR (False Rejection Rate) as evaluation indices indicating authentication accuracy of the biometric authentication algorism. The false acceptance rate is a probability that two different people are determined as an identical person when biometric information of the two different people is compared with each other. The false rejection rate is a probability that a person is erroneously determined as another person when biometric information of an identical person is compared with each other. When any of the values are smaller, the authentication accuracy becomes higher.

In order to measure these evaluation indices, an authentication simulation using a biometric data set collected from a plurality of users is performed. It is necessary to evaluate the authentication accuracy when a sensor is newly developed. Therefore, biometric data are collected with use of a new sensor. In order to satisfy a false acceptance rate (for example, 0.0001% level) needed for produced authentication technology, it is necessary to collect a few thousands or more biometric data (the number of fingers in a case of fingerprint authentication or the number of hands in case of palm authentication). Therefore, a cost increases. In terms of the cost, it is preferable that the number of biometric data to be collected is smaller. It is difficult to secure a collection period of the biometric data, an evaluation workload and so on.

There is a method called "Rule of 3" as an estimation method of a necessary number of biometric data. The method can determine a necessary minimum pair number of an enrolled data and a data for comparison for accurately statistically measure a false acceptance rate and a false rejection rate. In concrete, the number of the comparison pairs and the number of the biometric data that needed for evaluating the false acceptance rate (1%) and the false rejection rate (0.001%, 0.0001%) at a reliability of 95% are shown in Table 1. Generally, the number of the biometric data satisfying the false acceptance rate is larger than the number of the biometric data satisfying the false rejection rate. Therefore, the number of the biometric data is often determined in accordance with the false acceptance rate.

TABLE 1

| DEMANDED ACCURACY | FALSE REJECTION RATE | FALSE ACCEPTANCE RATE | |
|---|---|---|---|
| | 1% | 0.00% | 0.00% |
| COMPARISON PAIR NUMBER | 300 OR MORE | 300,000 OR MORE | 3,000,000 OR MORE |
| NUMBER OF BIOMETRIC DATA | 300 OR MORE | 774 OR MORE | 2450 OR MORE |

In order to solve the above-mentioned problem regarding the collection and the evaluation of the biometric data, it is expected that a desirable false acceptance rate is obtained from a relatively small scale biometric data set collected to the extent possible without collecting a large scale of biometric data. As a solution, it is supposed to estimate the false acceptance rate with a large scale biometric data set, with use of the false acceptance rate calculated with a small scale biometric data set (Herve Jarosz, Jean-Chistophe Fondeur and Xavier Dupre, "Large-Scale Identification System Design," Chapter 9, pp 272-275, Biometric Systems, Springer, 2004.).

The technology uses a generalized Pareto distribution that is one of an extreme value distribution, for estimating a false acceptance rate. In concrete, a bottom edge of a similarity distribution of different people's pair is fitted to the generalized Pareto distribution. A distribution of a region in which the false acceptance rate is low is extrapolated. And the false acceptance rate that is originally unmeasurable is estimated. The extreme value distribution indicates a distribution of the number of samples equal to or more than a threshold of samples in accordance with an arbitrary distribution function. Specifically, the extreme value distribution is a distribution in which a maximum value and a minimum value are approximately followed. The extreme value distribution is applied to a distribution of flood of a river or a maximum wind speed.

Figure 2:
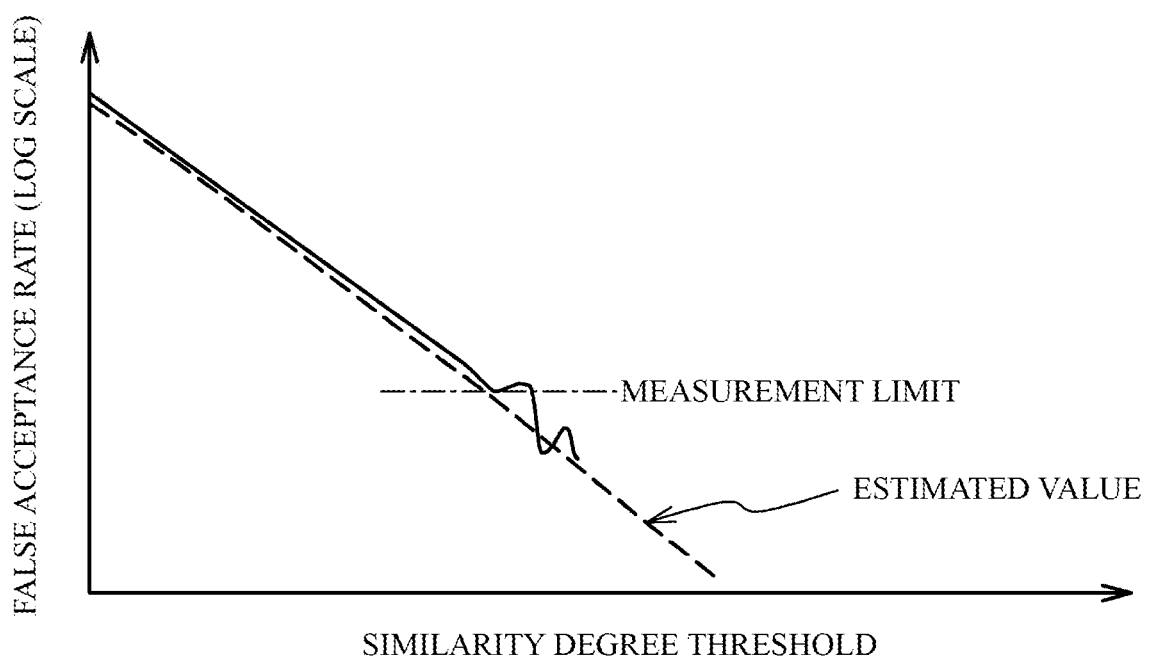
FIG. 2 illustrates estimation results of similarity degree distribution.

FIG. 1 and FIG. 2 illustrate estimated results of the above-mentioned technology. In FIG. 1 and FIG. 2, a horizontal axis indicates a similarity degree threshold. A vertical axis indicates a false acceptance rate. When a similarity degree of biometric data of different people's pair is equal to or more than the similarity degree threshold, the different people's pair are erroneously determined as an identical person. Therefore, when the similarity degree threshold is reduced, the false acceptance rate becomes larger. In this case, the number of the different people determined as an identical person becomes larger. Therefore, the measurement accuracy of the false acceptance rate is not reduced. On the other hand, when the similarity degree threshold becomes larger, the false acceptance rate becomes smaller. In this case, the number of different people determined as an identical person becomes smaller. Therefore, the measurement accuracy of the false acceptance rate becomes smaller. Accordingly, when the similarity degree threshold becomes larger, the measurement accuracy of the false acceptance rate becomes smaller.

In FIG. 1, a measurement limit determined from the number of all biometric data is illustrated. When the similarity degree threshold is equal to or more than the measurement limit, there is variability in the measurement accuracy of the false acceptance rate. FIG. 2 illustrates a false acceptance rate that is estimated with use of the generalized Pareto distribution. In FIG. 2, the estimated false acceptance rate is illustrated with a broken line. As illustrated in FIG. 2, when the generalized Pareto distribution is used, the variability of the measurement accuracy of the false acceptance rate is suppressed.

There is an evaluation method called a bootstrap method (Sarat Dass, Yongfang Zhu, and Anil Jain, "Validating a Biometric Authentication System: Sample Size Requirements," IEEE Trans. On PAMI, 2006.). In the bootstrap method, a plurality of subsets obtained by a random sampling from the collected biometric data set are generated. Each false acceptance rate is calculated with respect to each subset. When an average value of the calculated false acceptance rates is a final value, the average value is stably obtained as a false acceptance rate. A reliable section is calculated from dispersions of the false acceptance rates. The number of the biometric data needed for obtaining a desirable reliable section is determined.

Figure 3:
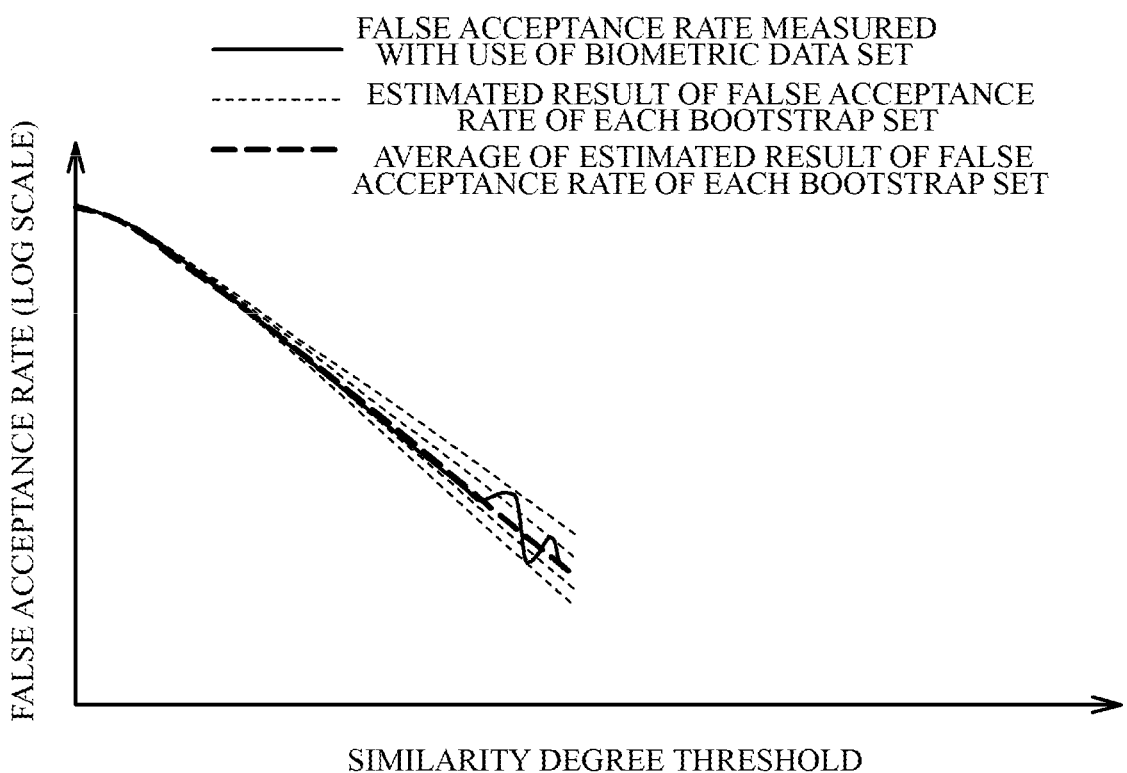
FIG. 3 illustrates estimated results of a false acceptance rate with use of a bootstrap method.

FIG. 3 illustrates estimated results of the false acceptance rate with use of the bootstrap method. In FIG. 3, a horizontal axis indicates the similarity degree threshold. A vertical axis indicates the false acceptance rate. A thin solid line indicates the false acceptance rate measured by using the biometric data set. A thin dotted line indicates the false acceptance rate measured from each bootstrap set. A thick dotted line indicates an average of these false acceptance rates measured from each bootstrap set. When the bootstrap method is used, the variability of the measurement accuracy of the false acceptance rate is suppressed.

Currently, there is no established method in methods for estimating a false acceptance rate over an accuracy limit from a small scale biometric data set. Moreover, there is no method for reducing the necessary number of the biometric data by using the estimated false acceptance rate. In the method using the generalized Pareto distribution, estimation accuracy of a bottom edge (a range in which the false acceptance rate is small) of a distribution is improved by introducing the generalized Pareto distribution. However, the biometric data set used for the evaluation tends to have influence on the method. Therefore, the false acceptance rate fluctuates in accordance with a false acceptance error that accidentally occurs. In the bootstrap method, the influence of the false acceptance that accidentally occurs by a random sampling is reduced, and the false acceptance rate is stably calculated. However, it is not prospected that the false acceptance rate is estimated over the measurement limit.

And so, in the following embodiments, a false acceptance rate over an accuracy limit is estimated from a small scale biometric data set. Moreover, a final false acceptance rate is estimated from the estimated false acceptance rate. Thereby, the false acceptance rate is estimated with a low cost. And, the necessary number of the biometric data is reduced.

First Embodiment

Figure 4:
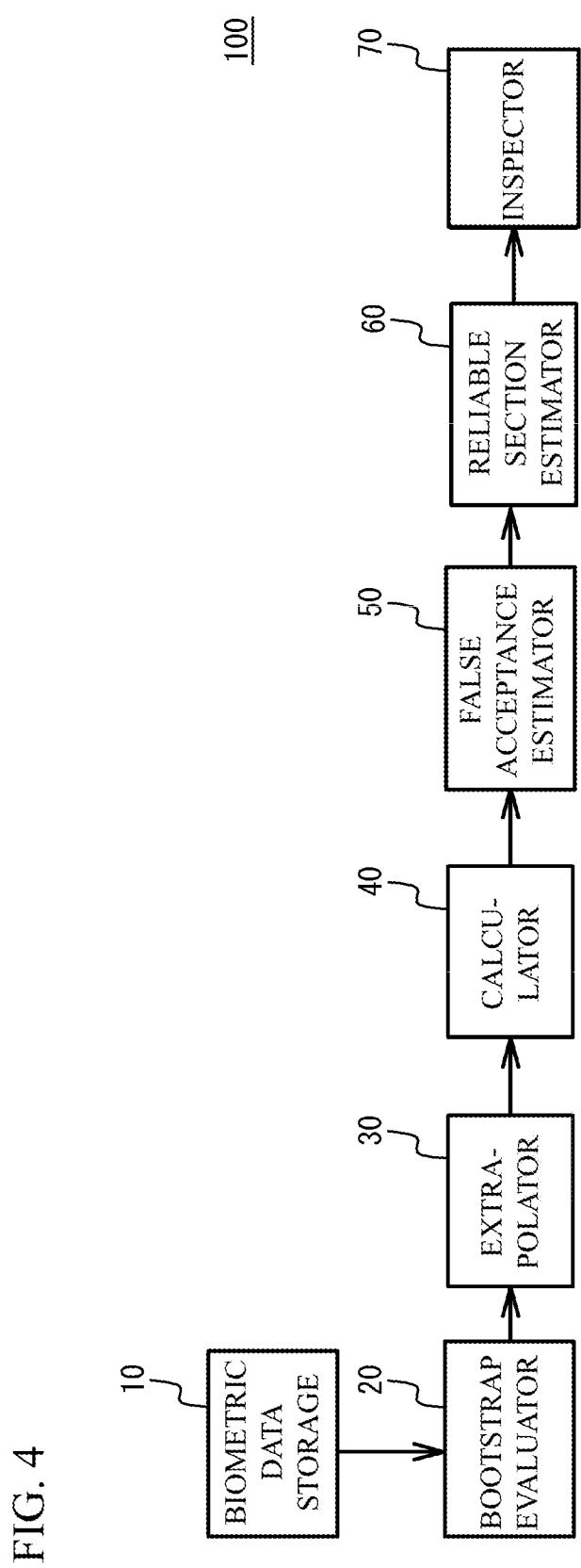
FIG. 4 illustrates a function block diagram of an evaluation device in accordance with a first embodiment.
Figure 5:
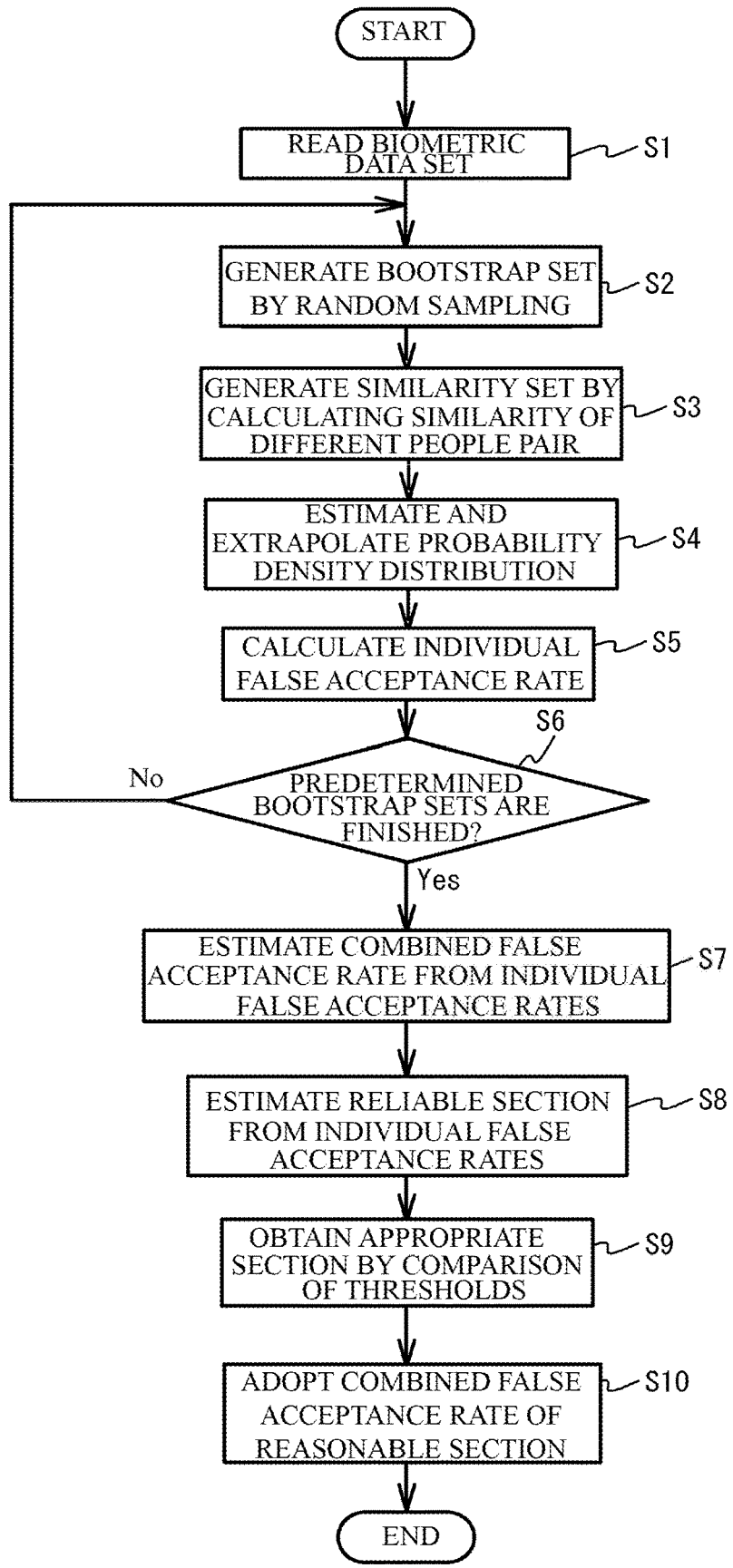
FIG. 5 illustrates a flowchart of an evaluation process executed by an evaluation device.

FIG. 4 illustrates a functional block diagram of an evaluation device 100 in accordance with a first embodiment. As illustrated in FIG. 4, the evaluation device 100 acts as a biometric data storage 10, a bootstrap evaluator 20, an extrapolator 30, a calculator 40, a false acceptance rate estimator 50, a reliable section estimator 60, and an inspector 70. FIG. 5 illustrates a flowchart of an evaluation process executed by the evaluation device 100. A description will be given of an operation of the evaluation device 100, on the basis of FIG. 4 and FIG. 5.

Figure 6:
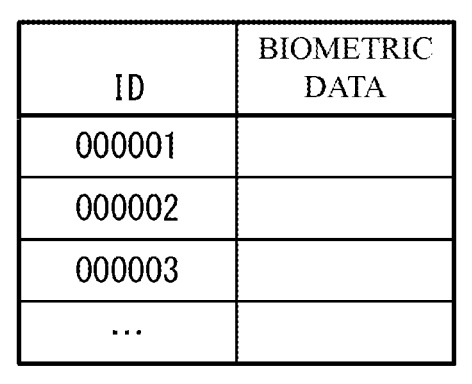

The bootstrap evaluator 20 reads a biometric data set from the biometric data storage 10 (Step S1). As illustrated in FIG. 6, the biometric data set has a data structure in which an ID of each user is related with a biometric data. The biometric data may be a biometric data of a specific modality of a specific instance or may be biometric data of an identical modality of a plurality of instances. The instance means a unit of biological body. Alternatively, the biometric data may be a biometric data in which a plurality of different modalities of an identical instance are combined or may be a biometric data in which a plurality of modalities of a plurality of different instances are combined.

Next, the bootstrap evaluator 20 generates a small scale set (hereinafter referred to as a bootstrap set) by randomly sampling biometric data from the biometric data set that is read in Step S1 (Step S2). The number of the biometric data in the bootstrap set is smaller than the number of the biometric data in the biometric data set. For example, a size of the bootstrap set (the number of data) is around 50% of the biometric data set.

Next, the extrapolator 30 makes a similarity degree set by calculating similarity degrees of all of different people's pairs (combination of different IDs) with use of a predetermined biometric authentication algorism (Step S3), with respect to the bootstrap set generated in Step S2. In the embodiment, the example of random sampling from the biometric data set is used. However, a partial set of similarity degree may be obtained by randomly sampling similarity degrees from the similarity degree set corresponding to the biometric data set.

Next, the extrapolator 30 estimates a probability density distribution by an arbitrary method, with respect to the obtained similarity degree set. Next, the extrapolator 30 extrapolates a section of which the number of data is small around a bottom edge of the distribution or a section without data, on the basis of the estimation result (Step S4). The probability density distribution may be estimated with use of a parametric approximation method or a non-parametric approximation method in a region including many similarity degree data, as the estimation method of the probability density distribution. Alternatively, the bottom edge of the distribution may be estimated with high accuracy by estimating the probability density distribution of a similarity degree set, with use of a generalized Pareto distribution, as a model of the distribution bottom edge. When the bottom edge of the distribution is extended on a presumption that the probability density distribution is continuous, it is possible to extrapolate a section in which there is no similarity degree data.

Figure 7:
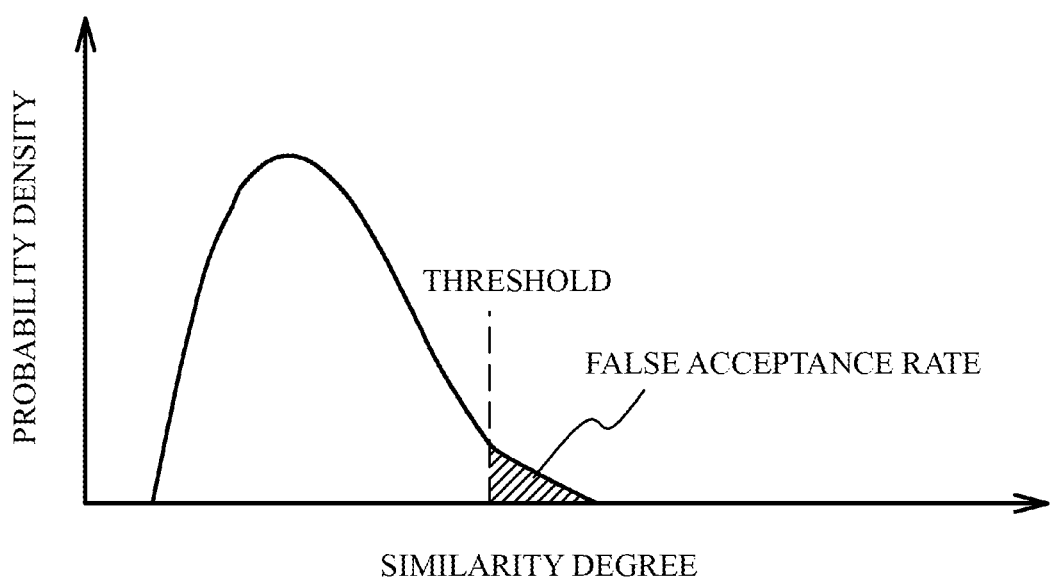
FIG. 7 illustrates a relationship between probability density distribution and a false acceptance rate of a similarity degree set of different people's pairs.

Next, the calculator 40 calculates a false acceptance rate of each similarity degree threshold from the estimated result of the similarity degree distribution of different people's pair (Step S5). FIG. 7 illustrates a relationship between the probability density distribution and the false acceptance rate of the similarity degree set of different people's pairs. The probability density distribution is obtained by dividing frequency of each similarity degree of different people's pairs by all samples. When the similarity degree threshold is set, the similarity degree of different people's pairs that is equal to or more than the threshold is a false acceptance error. When the estimated result of the distribution of the similarity degree set is f(s) and the similarity degree threshold is "threshold", the false acceptance rate of each bootstrap (hereinafter referred to as an individual false acceptance rate) may be expressed by the following formula (1). When a distance is used for the matching result, the individual false acceptance rate is expressed by the following formula (2).

$$\int_{threshold}^{\infty} f(s)ds \quad \text{[Formula 1]}$$

$$\int_{-\infty}^{threshold} f(s)ds \quad \text{[Formula 2]}$$

Next, the bootstrap evaluator 20 determines whether the individual false acceptance rates of all bootstraps of which the number is a predetermined value are calculated (Step S6). When it is determined as "No" in Step S6, Step S2 is executed again. In this case, the bootstrap evaluator 20 generates a bootstrap set including a different biometric data from the generated bootstrap sets.

When it is determined as "Yes" in Step 6, the false acceptance rate estimator 50 calculates a false acceptance rate of the biometric data set (hereinafter referred to as a combined false acceptance rate) by calculating statics such as an average, a median or the like on the basis of the plurality of individual false acceptance rates generated from the bootstrap sets (Step S7).

Next, the reliable section estimator 60 estimates statistics of variability such as a standard deviation, a dispersion, an upper limit value, a lower limit value or the like of the individual false acceptance rate of each bootstrap set, as the reliable section of the combined false acceptance rate (Step S8). For example, a percentile reliable section can be used as a calculation method of the reliable section. For example, each individual false acceptance rate is sorted in an ascending order. For example, a both-side reliable section of reliability of 95% is obtained from an upper limit to a lower limit. The upper limit is a maximum value of the false acceptance rate of which an upper 2.5% is removed. The lower limit is a minimum value of the false acceptance rate of which a lower 2.5% is removed.

Next, the inspector 70 determines whether the estimated result of the combined false acceptance rate is appropriate with respect to each similarity degree threshold by comparing at least one of the combined false acceptance rate and the reliable section with a predetermined range, with respect to each similarity degree threshold. For example, the inspector 70 determines whether the combined false acceptance rate is within a predetermined range and whether the reliable section is within a predetermined range, with respect to each similarity degree threshold. The inspector 70 determines a section determined as appropriate, as an appropriate section (Step S9). It is possible to use the reliable section used for the evaluation of other biometric data set as a predetermined threshold, in the same biometric authentication algorism. Next, the inspector 70 adopts the combined false acceptance rate in the appropriate section from the combined false acceptance rate (Step S10).

Figure 8:
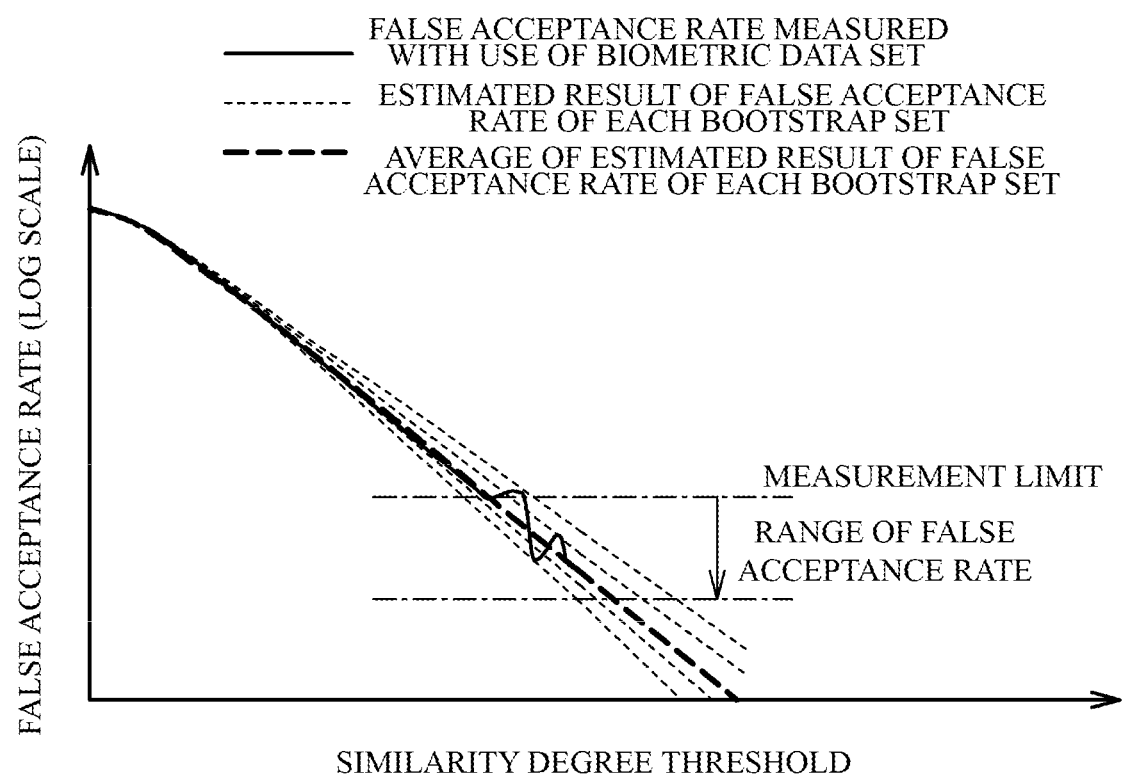
FIG. 8 illustrates a false acceptance rate estimated in accordance with a first embodiment.

FIG. 8 illustrates the combined false acceptance rate obtained by the above-mentioned process. In FIG. 8, a thick broken line indicates the combined false acceptance rate. A lower limit of "range of false acceptance rate" corresponds to the lower limit of the appropriate section. As illustrated in FIG. 8, it is possible to stably obtain the false acceptance rate over a measurement limit based on the sample number of the biometric data set.

In the embodiment, it is possible to calculate the individual false acceptance rate over the measurement limit of each bootstrap by estimating the probability density distribution of the similarity degree set with respect to each bootstrap set. And, it is possible to estimate the combined false acceptance rate with high accuracy because the statics of the plurality of individual false acceptance rates are used. It is therefore possible to estimate the combined false acceptance rate with high accuracy with a little number of the biometric data. That is, it is possible to reduce a cost for collecting data, a period for collecting biometric data, a workload for collecting biometric data.

It is possible to obtain the reliable section of the combined false acceptance rate by calculating the statics of variability such as a standard deviation, a dispersion, an upper limit, a lower limit or the like of the plurality of individual false acceptance rates. And, it is possible to determine whether the estimated results of the combined false acceptance rate are appropriate with respect to each similarity degree threshold by comparing at least one of the combined false acceptance rate and the reliable section with a predetermined threshold. When the combined false acceptance rate of the section (appropriate section) determined as appropriate is adopted, the accuracy of the combined false acceptance rate is improved.

Second Embodiment

Next, a description will be given of a second embodiment. The second embodiment is under a condition that there is a large scale biometric data set and the false acceptance rate obtained from the similarity calculated with different people's pairs is already known in the arbitrary biometric authentication algorism. The number of the biometric data for obtaining a desirable false acceptance rate is estimated with used of these data. The estimated result is used for evaluating another sensor. And, a scenario for collecting a new biometric data set is considered.

Figure 9:
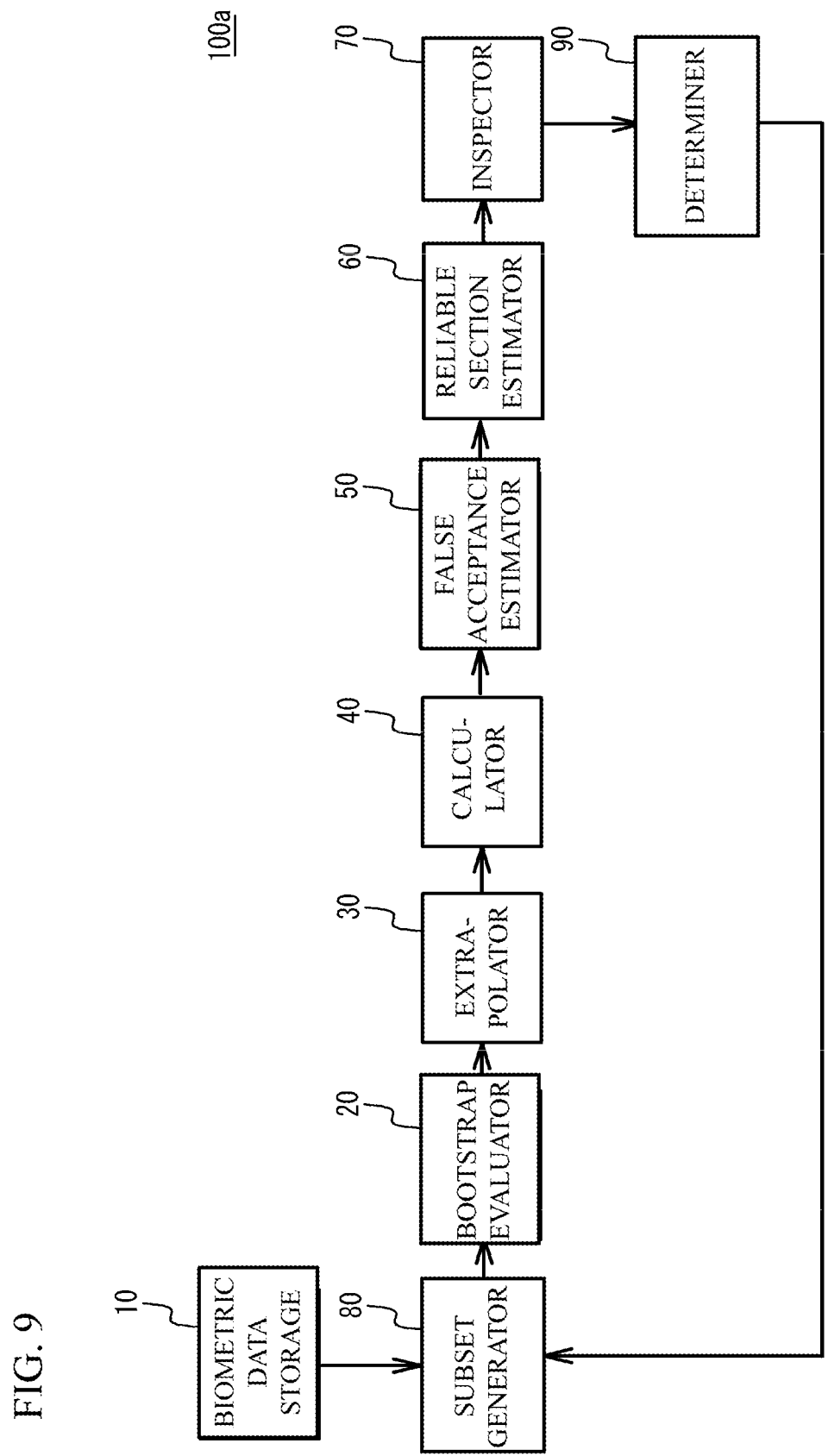
FIG. 9 illustrates a function block diagram of an evaluation device in accordance with a second embodiment.
Figure 10:
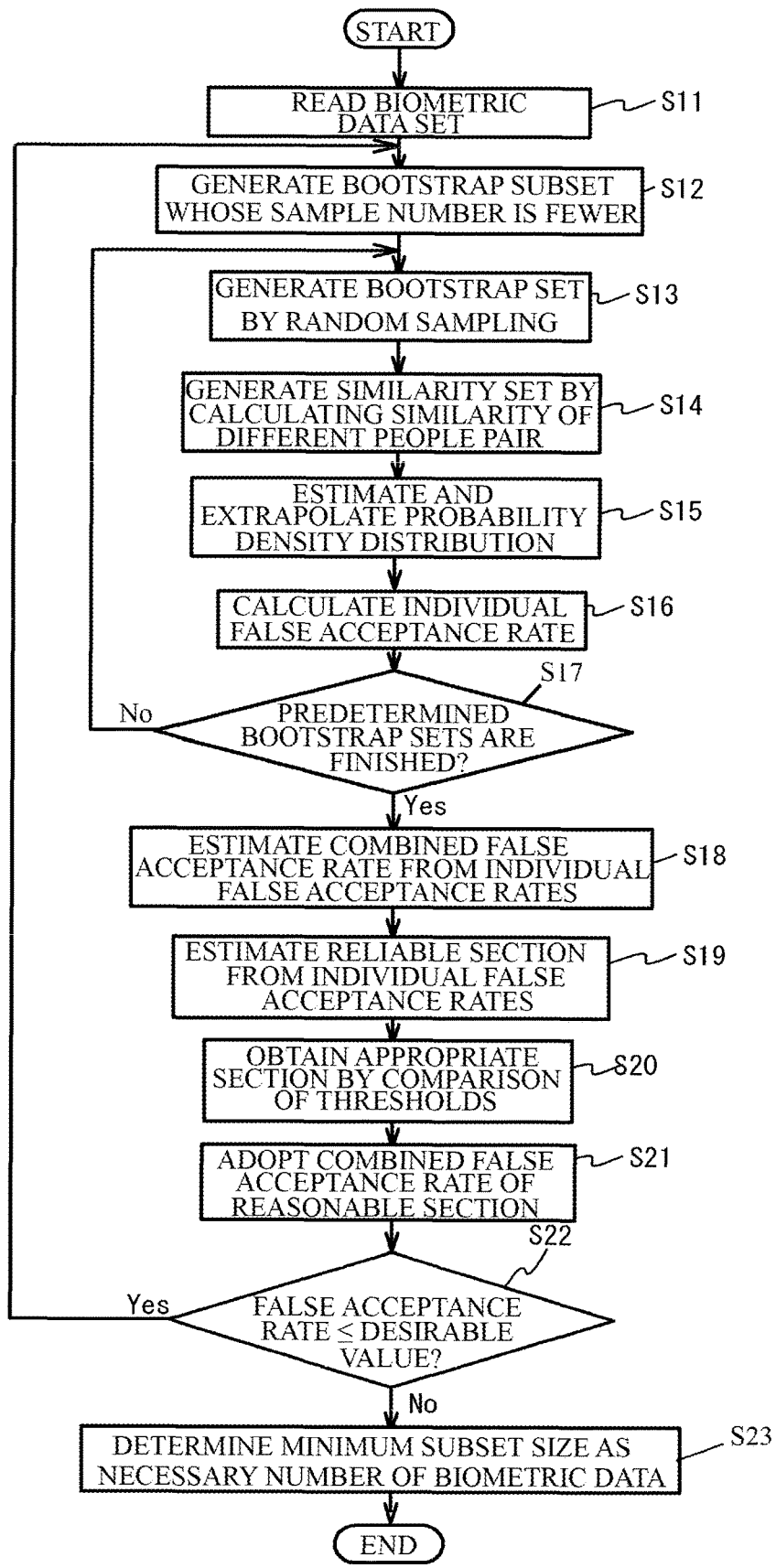
FIG. 10 illustrates a flowchart of an evaluation process executed by an evaluation device.

FIG. 9 illustrates a functional block diagram of an evaluation device 100a in accordance with the second embodiment. As illustrated in FIG. 9, the evaluation device 100a is different from the evaluation device 100 of FIG. 4 in a point that a subset generator 80 and a determiner 90 are provided. FIG. 10 illustrates a flowchart of an evaluation process executed by the evaluation device 100a. A description will be given of an operation of the evaluation device 100a on the basis of FIG. 9 and FIG. 10.

The subset generator 80 reads a biometric data set from the biometric data storage 10 (Step S11). Next, the subset generator 80 randomly samples biometric data from the biometric data set that is read in Step S11, and generates a subset (Step S12). The subset is a biometric data set of which the number of biometric data is lower than that of the biometric data set stored in the biometric data storage 10. Next, the bootstrap evaluator 20 generates a bootstrap set in which biometric data is randomly sampled from the subset generated in Step S12 (Step S13). For example, the size (the number of data) of the bootstrap set is around 50% of the subset.

Next, Step S14 to Step S21 are executed. Step S14 to Step S21 are the same as Step S3 to Step S10 of FIG. 5. However, the combined false acceptance rate estimated in Step S18 is not a false acceptance rate of a biometric data set but a false acceptance rate of a subset. Next, the determiner 90 determines whether a minimum value of the combined false acceptance rate of the subset adopted in Step S21 is equal to or less than a desirable false acceptance rate that is determined in advance (Step S22). When it is determined as "Yes" in Step S22, Step S12 is executed again. In Step S12, the subset generator 80 generates a subset of which the number of biometric data is less than that of the subset that is previously generated. When it is determined as "No" in Step S22, the determiner 90 determines the minimum size of the subsets as a necessary number of the biometric data (Step S23). That is, the number of the biometric data for obtaining a desirable false acceptance rate is estimated.

In the embodiment, in a range in which a minimum value of the combined false acceptance rate obtained with high accuracy is equal to or less than a threshold, the size of the subset is gradually reduced. It is therefore possible to estimate the number of biometric data for obtaining a desirable false acceptance rate. That is, it is possible to reduce a cost for collecting biometric data, a collection period of the biometric data, collection workload of the biometric data, and so on.

In the above-mentioned embodiments, a specific description is omitted. However, a modality of biometric data is not limited. For example, the embodiments can be applied to all modalities such as a fingerprint authentication, a vein authentication, an iris authentication, a face authentication and so on.

Figure 11:
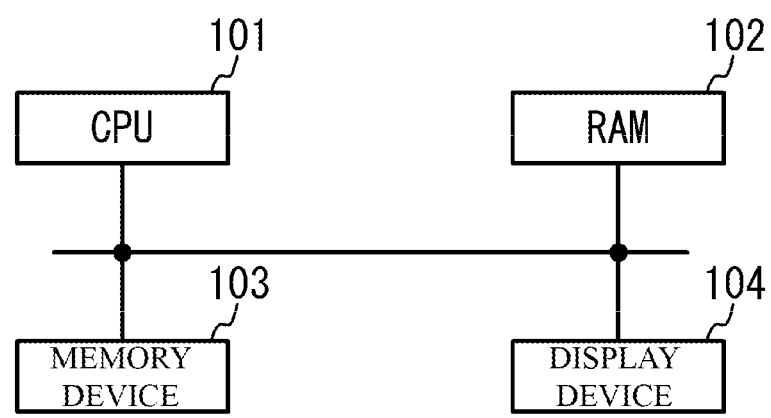
FIG. 11 illustrates a block diagram of a hardware structure of an evaluation device.

FIG. 11 illustrates a hardware structure of the evaluation device 100. As illustrated in FIG. 11, the evaluation device 100 has a CPU 101, a RAM (Random Access Memory) 102, a memory device 103, a display device 104 and so on.

The CPU 101 is a central processing unit. The CPU 101 includes one or more core. The RAM 102 is a volatile memory temporally storing a program executed by the CPU 101, a data processed by the CPU 101, and so on. The memory device 103 is a nonvolatile memory device. The memory device 103 may be a SSD (Solid State Drive) such as a ROM (Read Only Memory) or a flash memory, or a hard disk driven by a hard disk drive. The memory device 103 stores an evaluation program. The display device 104 is such as a liquid crystal device, an electroluminescence panel or the like and shows an evaluation result. Each component of the evaluation device 100 is achieved by the execution of the program. However, each component of the evaluation device 100 may be a hardware such as a dedicated circuit.

In the above-mentioned embodiments, the bootstrap evaluator 20 is an example of a generator configured to generate a plurality of sets from a first population of biometric data collected from a plurality of users, a number of biometric data of the plurality of sets being smaller than that of the first population, at least a part of the plurality of sets being different from each other. The extrapolator 30 is an example of a first estimator configured to estimate a probability density distribution of similarity degrees of different people's pairs of each of the plurality of sets. The calculator 40 is an example of a calculator configured to calculate a false acceptance rate with respect to each similarity degree threshold on a basis of the probability density distribution, with respect to each of the plurality of sets. The false acceptance rate estimator 50 is an example of a second estimator configured to estimate a combined false acceptance rate from a statistic amount of false acceptance rates of the plurality of sets calculated by the calculator. The determiner 90 is an example of a determiner configured to determine whether a minimum value of a false acceptance rate estimated by the second estimator is equal to or less than a threshold. The subset generator 80 is an example of an updater configured to update a population as the second population when it is determined that the minimum value is equal or less than the threshold, a number of samples of the population being smaller than that of the second population.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An evaluation device comprising:
a memory; and
a processor coupled to the memory and the processor configured to execute a process, the process comprising:
generating a plurality of sets from a first population of biometric data collected from a plurality of users, a number of the biometric data of the plurality of sets being smaller than that of the first population, at least a part of the plurality of sets being different from each other;
estimating a probability density distribution of similarity degrees of different people's pairs of each of the plurality of sets;
calculating a false acceptance rate with respect to each similarity degree threshold on a basis of the probability density distribution, with respect to each of the plurality of sets; and
estimating a combined false acceptance rate of the first population from a statistic amount of false acceptance rates of the plurality of sets calculated by the calculating,
wherein:
in the estimating of the combined false acceptance rate, the combined false acceptance rate in a range of the similarity degree threshold, in which at least one of a statistic amount related to variability of false acceptance rates of the plurality of sets and the combined false acceptance rate is a threshold or less, is adopted; and
the statistic amount is a standard deviation, a dispersion, an upper limit or a lower limit of the false acceptance rates.

2. The evaluation device as claimed in claim 1, wherein:
in the generating, the plurality of sets are generated from a second population extracted from the first population, a number of biometric data of the second population being smaller than that of the first population; and
the process further comprising determining whether a minimum value of a false acceptance rate estimated in the estimating of the combined false acceptance rate is equal to or less than a threshold.

3. The evaluation device as claimed in claim 2, the process further comprising:
updating a population as the second population when it is determined that the minimum value is equal or less than the threshold, a number of samples of the population being smaller than that of the second population,
wherein in the generating, the plurality of sets are generated from the second population that is updated by the updating.

4. The evaluation device as claimed in claim 1, wherein in the estimating of the probability density distribution, the probability density distribution is extrapolated by estimating the probability density distribution with use of a parametric approximation method or a non-parametric approximation method.

5. The evaluation device as claimed in claim 1, wherein in the estimating of the probability density distribution, the probability density distribution is extrapolated by estimating the probability density distribution with use of a generalized Pareto distribution.

6. An evaluation method comprising:
generating a plurality of sets from a first population of biometric data collected from a plurality of users, a number of the biometric data of the plurality of sets being smaller than that of the first population, at least a part of the plurality of sets being different from each other;
estimating a probability density distribution of similarity degrees of different people's pairs of each of the plurality of sets;
calculating a false acceptance rate with respect to each similarity degree threshold on a basis of the probability density distribution, with respect to each of the plurality of sets; and
estimating a combined false acceptance rate of the first population from a statistic amount of false acceptance rates of the plurality of sets calculated by the calculating
wherein:
in the estimating of the combined false acceptance rate, the combined false acceptance rate in a range of the similarity degree threshold, in which at least one of a statistic amount related to variability of false acceptance rates of the plurality of sets and the combined false acceptance rate is a threshold or less, is adopted; and
the statistic amount is a standard deviation, a dispersion, an upper limit or a lower limit of the false acceptance rates.

7. The evaluation method as claimed in claim 6, wherein:
in the generating, the plurality of sets are generated from a second population extracted from the first population, a number of biometric data of the second population being smaller than that of the first population; and
the evaluation method further comprising determining whether a minimum value of a false acceptance rate estimated in the estimating of the combined false acceptance rate is equal to or less than a threshold.

8. The evaluation method as claimed in claim 7, further comprising:
updating a population as the second population when it is determined that the minimum value is equal or less than the threshold, a number of samples of the population being smaller than that of the second population,
wherein in the generating, the plurality of sets are generated from the second population that is updated by the updating.

9. The evaluation method as claimed in claim 6, wherein in the estimating of the probability density distribution, the probability density distribution is extrapolated by estimating the probability density distribution with use of a parametric approximation method or a non-parametric approximation method.

10. The evaluation method as claimed in claim 6, wherein in the estimating of the probability density distribution, the probability density distribution is extrapolated by estimating the probability density distribution with use of a generalized Pareto distribution.

11. A computer-readable, non-transitory medium storing a program that causes a computer to execute a process, the process comprising:
generating a plurality of sets from a first population of biometric data collected from a plurality of users, a number of the biometric data of the plurality of sets being smaller than that of the first population, at least a part of the plurality of sets being different from each other;
estimating a probability density distribution of similarity degrees of different people's pairs of each of the plurality of sets;

calculating a false acceptance rate with respect to each similarity degree threshold on a basis of the probability density distribution, with respect to each of the plurality of sets; and estimating a combined false acceptance rate of the first population from a statistic amount of false acceptance rates of the plurality of sets calculated by the calculating wherein:

in the estimating of the combined false acceptance rate, the combined false acceptance rate in a range of the similarity degree threshold, in which at least one of a statistic amount related to variability of false acceptance rates of the plurality of sets and the combined false acceptance rate is a threshold or less, is adopted; and the statistic amount is a standard deviation, a dispersion, an upper limit or a lower limit of the false acceptance rates.

12. The medium as claimed in claim 11, wherein:

in the generating, the plurality of sets are generated from a second population extracted from the first population, a number of biometric data of the second population being smaller than that of the first population; and the process further comprising determining whether a minimum value of a false acceptance rate estimated in the estimating of the combined false acceptance rate is equal to or less than a threshold.

13. The medium as claimed in claim 12, further comprising:

updating a population as the second population when it is determined that the minimum value is equal or less than the threshold, a number of samples of the population being smaller than that of the second population, wherein in the generating, the plurality of sets are generated from the second population that is updated by the updating.

14. The medium as claimed in claim 11, wherein in the estimating of the probability density distribution, the probability density distribution is extrapolated by estimating the probability density distribution with use of a parametric approximation method or a non-parametric approximation method.

15. The medium as claimed in claim 11, wherein in the estimating of the probability density distribution, the probability density distribution is extrapolated by estimating the probability density distribution with use of a generalized Pareto distribution.

* * * * *